(12) United States Patent
Gill et al.

(10) Patent No.: US 12,272,144 B2
(45) Date of Patent: Apr. 8, 2025

(54) COMPUTER VISION-ASSISTED COMPLIANCE MONITORING

(71) Applicant: Capital One Services, LLC, McLean, VA (US)

(72) Inventors: Renee Gill, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/298,944

(22) Filed: Apr. 11, 2023

(65) Prior Publication Data

US 2024/0346827 A1 Oct. 17, 2024

(51) Int. Cl.
| | |
|---|---|
| *G06V 20/52* | (2022.01) |
| *G06Q 30/018* | (2023.01) |
| *G06T 7/246* | (2017.01) |
| *G06T 7/73* | (2017.01) |
| *G06V 40/18* | (2022.01) |
| *G08B 13/196* | (2006.01) |

(Continued)

(52) U.S. Cl.
CPC ........... *G06V 20/52* (2022.01); *G06Q 30/018* (2013.01); *G06T 7/246* (2017.01); *G06T 7/73* (2017.01); *G06V 40/193* (2022.01); *G08B 13/196* (2013.01); *H04N 7/181* (2013.01); *H04N 7/188* (2013.01); *H04N 23/695* (2023.01); *G06T 2207/10016* (2013.01); *G06T 2207/30201* (2013.01); *G06T 2207/30232* (2013.01)

(58) Field of Classification Search
None
See application file for complete search history.

(56) References Cited

U.S. PATENT DOCUMENTS

2009/0251545 A1* 10/2009 Shekarri ................ G06Q 10/00
348/158
2013/0124430 A1* 5/2013 Moir ................ G06Q 10/08345
705/330

(Continued)

FOREIGN PATENT DOCUMENTS

WO WO-2011123743 A1 * 10/2011 ......... G06K 9/00281

*Primary Examiner* — Hung Q Dang
(74) *Attorney, Agent, or Firm* — Harrity & Harrity, LLP

(57) ABSTRACT

In some implementations, a compliance monitoring device may detect a trigger event associated with a compliance-based interaction. The compliance-based interaction may be associated with a secure location, a user device of a user, a sensor associated with a secure object, and one or more cameras. The compliance monitoring device may cause the one or more cameras to capture a set of images associated with the compliance-based interaction. The compliance monitoring device may receive the images and may extract image information from the set of images. The compliance monitoring device may receive positioning information associated with the user device and status information associated with the secure object. The compliance monitoring device may analyze at least one of the image information, the positioning information, or the status information to identify a compliance rule violation. The compliance monitoring device may provide an alert indication based on identifying the compliance rule violation.

19 Claims, 8 Drawing Sheets

(51) Int. Cl.
   *H04N 7/18*      (2006.01)
   *H04N 23/695*    (2023.01)

(56) References Cited

U.S. PATENT DOCUMENTS

| | | | |
|---|---|---|---|
| 2015/0288788 A1* | 10/2015 | Liu | H04W 4/02 |
| | | | 455/414.1 |
| 2020/0388177 A1* | 12/2020 | Recker | G06F 3/011 |
| 2022/0163681 A1* | 5/2022 | Indovina | A61B 90/98 |
| 2022/0335805 A1* | 10/2022 | Volkerink | G08B 23/00 |
| 2023/0150512 A1* | 5/2023 | Doherty | G06Q 10/0639 |
| | | | 701/26 |

\* cited by examiner

COMPUTER VISION-ASSISTED COMPLIANCE MONITORING

BACKGROUND

Computer vision is a field of artificial intelligence that is associated with enabling devices to interpret and understand visual information from the world. Computer vision may include analyzing images, videos, and/or other types of visual data. The goal of computer vision is to develop algorithms and systems that can automatically analyze and understand visual data in a way that mimics the human visual system. Computer vision techniques may include image acquisition, image pre-processing, feature extraction, object recognition, and/or object tracking, among other examples.

SUMMARY

Some implementations described herein relate to a system for computer vision-assisted compliance monitoring. The system may include one or more sensors associated with one or more secure objects, one or more user devices associated with one or more users, one or more cameras, one or more memories, and one or more processors, communicatively coupled to the one or more memories. The one or more processors may be configured to detect, using one or more computer vision techniques, a trigger event associated with a compliance-based interaction that occurs at a secure location, wherein the compliance-based interaction is associated with at least one secure object, of the one or more secure objects, or a user device, of the one or more user devices, or a user, of the one or more users, that us associated with the user device. The one or more processors may be configured to adjust, based on detecting the trigger event, at least one camera, of the one or more cameras, to align a field of view of the at least one camera with the secure location. The one or more processors may be configured to cause the one or more cameras to capture video data associated with at least one secure object, the user device, or the user. The one or more processors may be configured to obtain, from the one or more cameras, the video data. The one or more processors may be configured to obtain, from the user device, positioning information associated with the user device. The one or more processors may be configured to obtain, from the one or more sensors, status information associated with the secure object. The one or more processors may be configured to analyze at least one of the video data, the positioning information, or the status information to identify a compliance rule violation. The one or more processors may be configured to provide, to the user device, an alert indication based on identifying the compliance rule violation.

Some implementations described herein relate to a method of computer vision-assisted compliance monitoring. The method may include detecting, by a device, a trigger event associated with a compliance-based interaction. The method may include wherein the compliance-based interaction is associated with a secure location, a user device of a user, a sensor associated with a secure object, and one or more cameras. The method may include causing, by the device and based on detecting the trigger event, a camera, of the one or more cameras, to move from a first position to a second position, wherein a field of view of the camera is pointed in a direction toward the secure location when the camera is in the second position. The method may include causing, by the device, the one or more cameras to capture a set of images associated with the compliance-based interaction. The method may include receiving, by the device, the set of images. The method may include extracting, by the device, image information from the set of images, the image information including timestamp information associated with the set of images. The method may include receiving, by the device and from the user device of the user, positioning information associated with the user device of the user. The method may include receiving, by the device and from the sensor associated with the secure object, status information associated with the secure object. The method may include analyzing, by the device, at least one of the image information, the positioning information, or the status information to identify a compliance rule violation. The method may include determining, based on the compliance rule violation, a remedy for the compliance rule violation. The method may include automatically providing, by the device and to the user device, an indication of the remedy for display via a user interface of the user device.

Some implementations described herein relate to a non-transitory computer-readable medium that stores a set of instructions. The set of instructions, when executed by one or more processors of a device, may cause the device to detect a trigger event associated with a compliance-based interaction at a secure location, wherein the compliance-based interaction is associated with a user device of a user, a sensor associated with a secure object, and one or more cameras. The set of instructions, when executed by one or more processors of the device, may cause the device to cause, based on detecting the trigger event, the one or more cameras to capture video data associated with the compliance-based interaction, the video data including timestamp information. The set of instructions, when executed by one or more processors of the device, may cause the device to receive, from the one or more cameras, the video data. The set of instructions, when executed by one or more processors of the device, may cause the device to receive, from the user device, user device information associated with the user device of the user, wherein the user device information includes at least one of positioning information or authorization information associated with the user device. The set of instructions, when executed by one or more processors of the device, may cause the device to receive, from the sensor associated with the secure object, status information associated with the secure object. The set of instructions, when executed by one or more processors of the device, may cause the device to analyze at least one of the video data, the user device information, or the status information to identify a compliance rule violation. The set of instructions, when executed by one or more processors of the device, may cause the device to automatically transmit an alert indication to the user device.

DETAILED DESCRIPTION

Figure 1A:
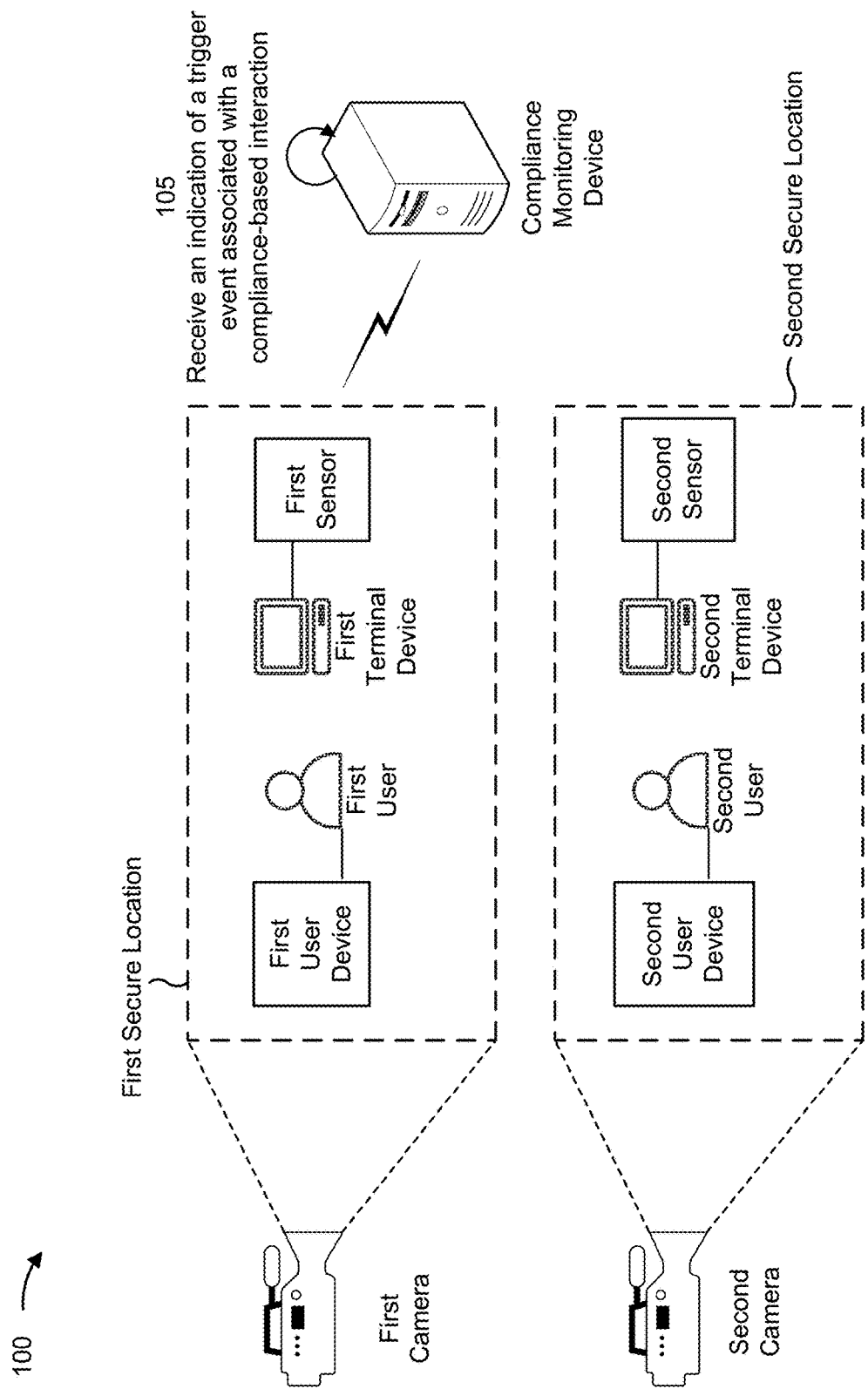
FIGS. 1A-1E are diagrams of an example associated with computer vision-assisted compliance monitoring, in accordance with some embodiments of the present disclosure.

The following detailed description of example implementations refers to the accompanying drawings. The same reference numbers in different drawings may identify the same or similar elements.

A compliance-based interaction may be an interaction that is associated with one or more compliance rules. The one or more compliance rules may indicate information associated with a manner in which the compliance-based interaction is to be performed, such as one or more requirements associated with the compliance-based interaction (e.g., operational requirements, procedural requirements, and/or administrative requirements associated with the compliance-based interaction, among other examples). In other words, a compliance-based interaction may be an interaction that is to be performed according to information indicated by one or more compliance rules.

A compliance monitoring system may monitor a compliance-based interaction to ensure conformity with one or more compliance rules associated with the compliance-based interaction. For example, the compliance monitoring system may identify a compliance rule violation based on determining that an operational requirement associated with the compliance-based interaction is not being met.

As an example, a compliance-based interaction may be associated with a compliance rule that indicates a secure object (e.g., a cash drawer) is to be transitioned to a locked state after an item (e.g., cash) is deposited into the secure object. A compliance monitoring system may identify a compliance rule violation based on determining that the secure object is in an unlocked state after the item is deposited into the secure object.

As another example, a compliance-based interaction may be associated with a compliance rule that indicates that a door associated with a secure location (e.g., a door of a vault room) must be in a closed state at a time when an item (e.g., cash) is deposited in a secure object (e.g., a vault). A compliance monitoring system may identify a compliance rule violation based on determining that the door associated with the secure location is in an open state at the time when the item is deposited in the secure object.

However, in some cases, the compliance monitoring system has difficulties coordinating among multiple devices in real time to automatically identify and/or report compliance rule violations. For example, a compliance rule may be associated with multiple conditions that must be met for a compliance rule violation to occur. The multiple conditions may be associated with multiple different aspects of the compliance-based interaction. Thus, in some cases, the multiple different aspects of the compliance-based interaction may need to be simultaneously monitored to determine whether a compliance rule violation occurs.

However, because the compliance monitoring system uses a single camera to obtain video data associated with the compliance-based interaction, the compliance monitoring system has difficulty obtaining data associated with each of the multiple different aspects of the compliance-based interaction (e.g., based on each of the multiple conditions). For example, a compliance rule violation associated with a compliance-based interaction may occur if a first condition and a second condition are satisfied. If the first condition is that a distance between a location of a user and a location of a cash drawer satisfies a distance threshold, and if the second condition is that the cash drawer is in an unlocked state, then the compliance monitoring system cannot determine whether the compliance rule is violated.

For example, because the compliance monitoring system uses a single camera, the compliance monitoring system cannot determine, based on analyzing video data from the single camera, whether the cash drawer is in an unlocked state (e.g., because the lock mechanism may be located inside of the cash drawer, which is not viewable by the single camera). Because the compliance monitoring system cannot determine whether the cash drawer is in the unlocked state, the compliance monitoring system cannot determine whether the second condition is satisfied. As a result, the compliance monitoring system cannot automatically identify and/or report a compliance rule violation.

As another example, if the first condition is that a user must place cash in a particular location within a cash drawer, and if the second condition is that the cash drawer is in a closed state after the user deposits the cash in the particular location within the cash drawer, then the compliance monitoring system cannot determine whether the compliance rule is violated. For example, because the compliance monitoring system uses a single camera, the compliance monitoring system cannot determine, based on analyzing video data from the single camera, whether the user places the cash in the particular location within the cash drawer.

For example, if the user is positioned between a field of view of the camera and the cash drawer, then the single camera cannot obtain video data associated with the user placing the cash in the cash drawer. Because the single camera cannot obtain the video data associated with the user placing the cash in the cash drawer, the compliance monitoring system cannot determine whether the second condition is satisfied. As a result, the compliance monitoring system cannot automatically identify and/or report a compliance rule violation. Therefore, the compliance monitoring system may capture and/or store a large amount of image data and/or video data associated with interactions to enable a user to review the image data and/or video data to identify potential violations. This consumes processing resources, computing resources, memory resources, and/or network resources associated with capturing and/or storing the large amount of image data and/or video data.

Some implementations described herein enable computer vision-assisted compliance monitoring (e.g., of compliance-based interactions). For example, a compliance monitoring device may use one or more cameras (e.g., that have a movable field of view and/or that may monitor more than one secure location), one or more sensors associated with one or more secure objects, and/or one or more user devices, of users, to identify one or more compliance rule violations (e.g., based on violations of compliance rules associated with the compliance-based interactions).

As an example, the compliance monitoring device may detect a trigger event associated with the compliance-based interaction. For example, the one or more cameras may detect movement of the one or more user devices and/or movement of the one or more users when a field of view, of the one or more cameras, is in a direction toward a secure location associated with the compliance-based interaction. In some implementations, the compliance monitoring device may adjust, based on detecting the trigger event, at least one camera, of the one or more cameras, to align a field of view of the at least one camera with the secure location. In other words, the compliance monitoring device may operate multiple cameras in synchronized manner to monitor a compliance-based interaction with an unobstructed field of view.

The compliance monitoring device may obtain video data captured by the one or more cameras, user device information from the one or more user devices, and/or sensor information from the one or more sensors. The compliance monitoring device may analyze the video data, the user device information, and/or the sensor information to identify one or more compliance rule violations. For example, the compliance monitoring device may use one or more computer vision techniques to analyze the video data. For example the compliance monitoring device may use an object detection technique and/or an object recognition technique to identify one or more features associated with the secure object, the user device, and/or the user, among other examples. As another example, the compliance monitoring device may use an object tracking technique to track (e.g., a movement) of one or more features associated with the secure object, the user device, and/or the user, among other examples.

In some implementations, the compliance monitoring device may apply one or more rules to the video data, the user device information, or the sensor information. For example, a compliance rule associated with the compliance-based interaction may indicate that a distance between a user device location of the user device (e.g., an employee) and a location of the secure location (e.g., a location associated with a workstation of the employee) must not satisfy a distance threshold during the compliance-based interaction. The compliance monitoring device may determine, based on the user device information, a user device location of the user device. The compliance monitoring device may compare the user device location to a location of the secure object to determine whether a distance between the user device location and the location of the secure object satisfies a distance threshold during the compliance-based interaction. The compliance monitoring device may identify a compliance rule violation based on the distance satisfying the distance threshold during the compliance-based interaction.

In some implementations, the compliance monitoring device may provide an alert indication to the user device. As an example, the alert indication may include a text indication that describes a remedy for the compliance rule violation (e.g., which may be displayed on a user interface of the user device). As another example, alert indication may be an audible indication (e.g., for output via a speaker component of the user device) and/or a haptic indication (e.g., for output via a haptic feedback component of the user device).

In some implementations, the compliance monitoring device may generate compliance rule violation information. The compliance rule violation information may include an indication of a date and a time associated with the compliance rule violation, an indication of a compliance rule violation type, and/or an indication of an identifier of the user associated with the compliance rule violation. As an example, the compliance monitoring device may automatically provide, to a different device (e.g., of a supervisor of an employee) the compliance rule violation information.

In some implementations, the compliance monitoring device may receive, from the user device, a user input provided via an input option (e.g., displayed on the user interface of the user device). As an example, the user input may indicate that the compliance rule violation is remedied (e.g., the user may remedy the compliance rule violation and provide the user input to confirm that the compliance rule violation is remedied. In some implementations, the compliance monitoring device may receive the video data via a real-time video stream. As an example, the compliance monitoring device may analyze the video data, the user device information and/or the sensor information in real-time to automatically identify a compliance rule violation and/or provide information associated with the compliance rule violation (e.g., to a supervisor and/or a third party, among other examples).

In this way, the compliance monitoring device may coordinate among multiple devices (e.g., one or more cameras, one or more user devices (e.g., of users), and/or one or more sensors associated with one or more secure objects, in real time, to automatically identify and/or report compliance rule violations (e.g., to an employee, a supervisor of the employee, and/or a third party, among other examples). By coordinating among multiple devices to automatically identify and/or report compliance rule violations, the compliance monitoring device can obtain all data necessary to determine whether a compliance rule violation occurs. This conserves resources (e.g., processing resources, memory resources, and/or network resources) that would have otherwise been used to analyze some data, but not enough data, to determine whether a compliance rule violation occurs.

Additionally, or alternatively, because the compliance rule violations are identified in real time, a need to store data and/or analyze data at a later date is mitigated, which conserves processing resources, memory resources, and/or network resources, among other examples, that would have otherwise been used to store large amount of image data and/or video data. Furthermore, because the compliance monitoring device automatically identifies and/or reports compliance rule violations, resources (e.g., processing resources, memory resources, and/or network resources) are conserved that would have otherwise been used to manually review data associated with interactions that are not associated with a compliance rule violation.

Additionally, the compliance monitoring device enables the one or more compliance rule violations to be quickly and/or effectively remedied (e.g., because the compliance monitoring device provides an indication of the one or more compliance rule violations shortly after identifying the one or more compliance rule violations).

FIGS. 1A-1E are diagrams of an example 100 associated with computer vision-assisted compliance monitoring. As shown in FIGS. 1A-1E, example 100 includes a compliance monitoring device, a first user device, a first terminal device, a first sensor, a first camera, a second user device, a second terminal device, a second sensor, and a second camera. These devices are described in more detail in connection with FIGS. 2 and 3. As further shown and described in connection with FIGS. 1A-1E, in example 100, the compliance monitoring device may monitor a first secure location and a second secure location. In other examples, the compliance monitoring device may monitor a single secure location or more than two secure locations in a similar manner as described herein.

As shown in FIG. 1A, and by reference number 105, the compliance monitoring device may receive an indication of a trigger event associated with a compliance-based interaction. For example, the first user device, the first terminal device, and/or the first camera may transmit, and the compliance monitoring device may receive, the indication of the trigger event associated with the compliance-based interaction, as described in more detail elsewhere herein. Although in some implementations first user device, the first terminal device, and/or the first camera may transmit, and the compliance monitoring device may receive, the indication of the trigger event, in other implementations the compliance monitoring device may detect the trigger event by analyzing data associated with the first user device, the first terminal device, and/or the first camera, as described in more detail elsewhere herein. In some implementations, the trigger event may be associated with detecting a start of the compliance-based interaction (e.g., the first user device, the first terminal device, the first sensor, and/or the first camera may detect the start of the compliance-based interaction, as described in more detail elsewhere herein).

In some implementations, the trigger event may be associated with detecting a user interaction of the first user. As an example, the first user device and/or the first terminal device may detect the user interaction, associated with the first user, via a user interface of the first user device and/or a user interface of the first terminal device. For example, the first user device and/or the first terminal device may detect an interaction with an input option, by the first user, provided for display via the user interface of the first user device and/or the first terminal device. As an example, the first user (e.g., an employee) may interact with the input option (e.g., may press a button presented on a touchscreen) of the first terminal device (e.g., a computer associated with the employee), which causes an action associated with the compliance-based interaction to occur (e.g., a cash drawer associated with the first terminal device may open when the employee presses the button).

In some implementations, the first user device and/or the first terminal device may generate the indication of the trigger event in response to detecting the user interaction, by the first user, with the user interface of the first user device and/or the first terminal device. The compliance monitoring device may receive, and the first user device and/or the first terminal device may transmit, the indication of the trigger event associated with the compliance-based interaction.

In some implementations, the trigger event may be associated with the first sensor detecting motion data that indicates a motion and/or a movement associated with the first terminal device. For example, the first terminal device may include a secure object (e.g., a cash drawer), that is movable between a first position (e.g., a closed position) and a second position (e.g., an open position) and/or that is associated with a first state (e.g., a locked state) and a second state (e.g., an unlocked state).

As an example, the first sensor may be disposed on the secure object to detect the motion data (e.g., the first sensor may include an accelerometer that senses the motion data when the secure object moves from the first position to the second position and/or when the secure object moves from the second position to the first position). As another example, a sensor field of view of the first sensor may point in a direction toward the secure object to detect the motion data (e.g., the first sensor may include a motion sensor that senses the motion data when the secure object moves within the sensor field of view).

In some implementations, the first sensor may transmit, and the first terminal device may receive, the motion data. The first terminal device may generate the indication of the trigger event in response to receiving the motion data that indicates the movement of the secure object. The compliance monitoring device may receive, and the first terminal device may transmit, the indication of the trigger event associated with the compliance-based interaction.

In some implementations, the trigger event may be associated with the first camera initially capturing video data associated with the compliance-based event (e.g., by detecting motion and/or movement associated with the first user device, the first user, and/or the secure object). For example, a field of view of the first camera may point in a direction toward the first secure location and/or may be configured to capture video data based on detecting motion and/or movement associated with the first secure location (e.g., movement of the first user device, the first user, and/or the secure object).

As an example, if the first camera detects movement associated with the first user device and/or the first user when the field of view is pointed in the direction toward the first secure location (e.g., if the first user device and/or the first user enter into the secure location to interact with the first terminal device), then the first camera may begin capturing (e.g., recording and/or storing) the video data based on detecting the movement associated with the first user device and/or the first user. For example, if the first user device is a wearable communication device, if the first user is an employee, and if the first terminal device is an employee workstation, then the first camera may detect movement of wearable communication device and/or the employee when the employee moves into the secure location to interact with the employee workstation.

As another example, if the first camera detects movement associated with the first terminal device when the field of view of the first camera is pointed in the direction toward the first secure location, then the first camera may begin capturing video data based on detecting the movement associated with the first terminal device. For example, if the first user device is a wearable communication device, if the first user is an employee, and if the first terminal device is an employee workstation that includes a cash drawer, then the first camera may detect movement of the cash drawer when the employee interacts with the employee workstation to open the cash drawer.

In some implementations, the first camera may generate the indication of the trigger event associated with the compliance-based interaction in response to capturing the video data. As an example, the compliance monitoring device may receive, and the first camera may transmit, the indication of the trigger event associated with the compliance-based interaction. In this way, the compliance monitoring device may effectively monitor the compliance-based interaction (e.g., by becoming aware of the compliance-based interaction at a time shortly after the start of the compliance-based interaction). This conserves resources (e.g., processing resources, computing resources, and/or memory resources) that would have otherwise been used to monitor all data rather than monitoring and/or analyzing data when the trigger event is detected.

Figure 1B:
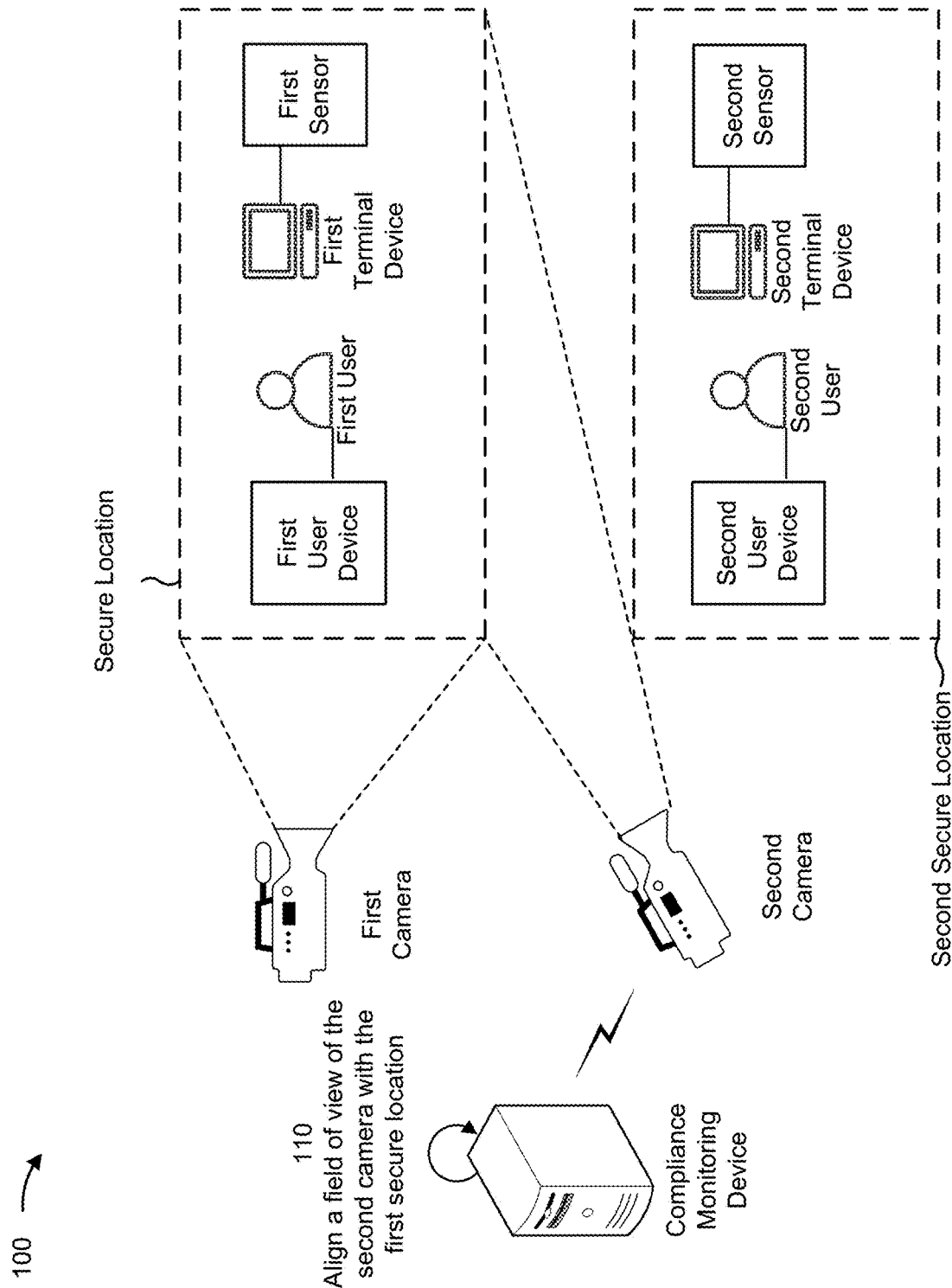

As shown in FIG. 1B, and by reference number 110, the compliance monitoring device may cause a field of view of the second camera to be aligned with the first secure location (e.g., based on detecting the trigger event). For example, the compliance monitoring device may align the field of view of the second camera in a direction toward the first secure location (e.g., in response to receiving the indication of the trigger event associated with the compliance-based interaction). In other words, the compliance monitoring device may reposition the second camera (e.g., may cause the second camera to rotate along an axis) to move the field of view of the second camera from pointing in a direction toward the second secure location to pointing in the direction toward the first secure location. Although the compliance monitoring device is described as causing the field of view of the second camera to be aligned with the first secure location (e.g., based on detecting the trigger event), in some other implementations, the compliance monitoring device may adjust the second camera to align the field of view with the first secure location (e.g., without physically moving the second camera). As an example, the compliance monitoring device may digitally adjust the field of view of the second camera (e.g., by digitally adjusting zoom levels associated with the second camera and/or by using a digital, pan, tilt, and zoom (PTZ) technique, which enables the field of view of the second camera to be digitally adjusted, among other examples).

As shown in FIG. 1B, the field of view of the second camera (e.g., that points in the direction toward the first secure location) is an unobstructed field of view (e.g., one or more portions of the field of view of the second camera are not completely blocked). In this way, the compliance monitoring device may use multiple cameras (e.g., in a synchronized manner) with an unobstructed field of view to effectively monitor a compliance-based interaction, which enables the compliance monitoring device to effectively identify compliance rule violations associated with the compliance-based interaction.

Figure 1C:
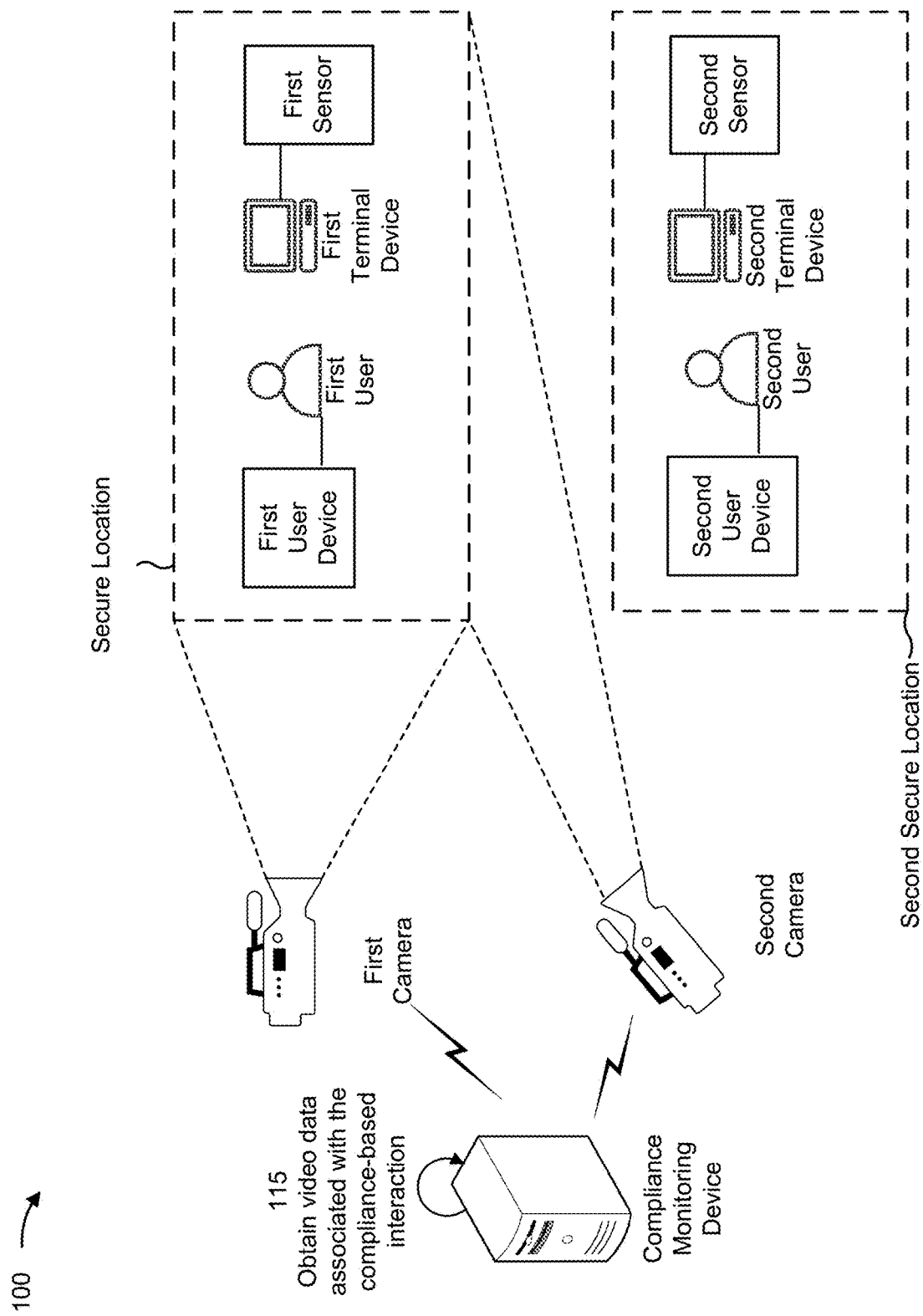

As shown in FIG. 1C, and by reference number 115, the compliance monitoring device may obtain video data (e.g., image data and/or audio data) associated with the compliance-based interaction (e.g., associated with the first secure location). For example, the first camera may capture the video data based on detecting the trigger event associated with the compliance-based event. As another example, the compliance monitoring device may cause the first camera and/or the second camera to capture the video data in response to receiving the indication of the trigger event associated with the compliance-based interaction. In some implementations, the first camera and/or the second camera may capture real-time video data. As an example, the first camera and/or the second camera may transmit, and the compliance monitoring device may receive, the real-time video data via a live feed (e.g., a real-time video stream).

In some implementations, the first camera and/or the second camera may capture a set of images associated with the first user device, the first user, the first terminal device, the secure object, and/or a foreign object, among other examples. A foreign object may be an object that is not associated with the compliance-based interaction and/or that is indicated by a compliance rule as being a foreign object. For example, if the compliance-based interaction is associated with only the first user device, the first user, the first terminal device, and/or the secure object, then any other object that is identified (e.g., by the first camera, the second camera, and/or the compliance monitoring device) is a foreign object. As an example, a foreign object may be a document (e.g., a customer document that is dropped within the first secure location by the first user), trash (e.g., left by the first user within the first secure location), broken glass (e.g., if a touchscreen of the first terminal device is broken and the broken glass falls within the first secure location), and/or a roll of coins (e.g., dropped by the first user within the first secure location), among other examples.

In some implementations, the first camera and/or the second camera may extract image information from the set of images. As an example, the image information may include timestamp information associated with the set of images. A timestamp may indicate a date and/or time at which an image is captured. In some implementations, each image, of the set of images, may include one or more features (e.g., of the first user device, the first user, the secure object, and/or the foreign object). For example, features associated with the first user device may include visual elements of a color and/or a shape of the first user device. As an example, features associated with the first user may include visual elements of iris features and/or facial characteristics of the first user. As another example, features associated with the secure object may include visual elements of a shape associated with the first position, a shape associated with the second position, a shape associated with the first state, and/or a shape associated with the second state.

As another example, features associated with the foreign object may include visual elements of a color and/or a shape of the foreign object. Although features (e.g., associated with the first user device, the first user, the secure object, and/or the foreign object) including visual elements have been described herein, a feature (e.g., associated with the first user device, the first user, the secure object, and/or the foreign object) may include any visual element (e.g., a shape, a texture, a color, a color pattern, a curvature, a physical size, a luminosity, and/or a design, among other examples) that can be viewed and/or captured in an image.

In some implementations, the first camera and/or the second camera may analyze the video data (e.g., using one or more computer vision techniques). For example, the first camera and/or the second camera may extract object detection data and/or object recognition data associated with the first user device, the first user, the secure object, and/or the foreign object from the video data. As an example, the first camera and/or the second camera may process an image (e.g., by using the object detection technique and/or the object recognition technique) to detect, determine, and/or identify one or more features of the first user device, the first user, the secure object, and/or the foreign object (e.g., one or more distinguishing features that would be relevant to monitoring the compliance-based interaction). For example, the first camera and/or the second camera may process an image using a computer vision technique, such as an object detection technique and/or an object recognition technique, to identify and/or localize the first user device, the first user, the secure object, and/or the foreign object, (e.g., based on detecting, determining, and/or identifying the one or more features).

In some implementations, the first camera and/or the second camera may extract object tracking data associated with the first user device, the first user, the secure object, and/or the foreign object from the video data. For example, the first camera and/or the second camera may process the set of images using a computer vision technique (e.g., by using an object tracking technique), to track the one or more features of the first user device, the first user, the secure object, and/or the foreign object.

As an example, the first camera and/or the second camera may use the object tracking technique to track a gaze associated with the first user to determine whether the gaze is associated with a direction toward the first secure location during the compliance-based interaction, as described in more detail elsewhere herein. Although in some implementations the first camera and/or the second camera may process an image and/or a set of images (e.g., to detect, determine, identify, localize, and/or track the one or more features), in some other implementations the compliance monitoring device may receive an image or image data (e.g., associated with the set of images) from the first camera and/or the second camera to process the image (e.g., via the one or more computer vision techniques to detect, determine, identify, localize, and/or track the one or more features).

Figure 1D:
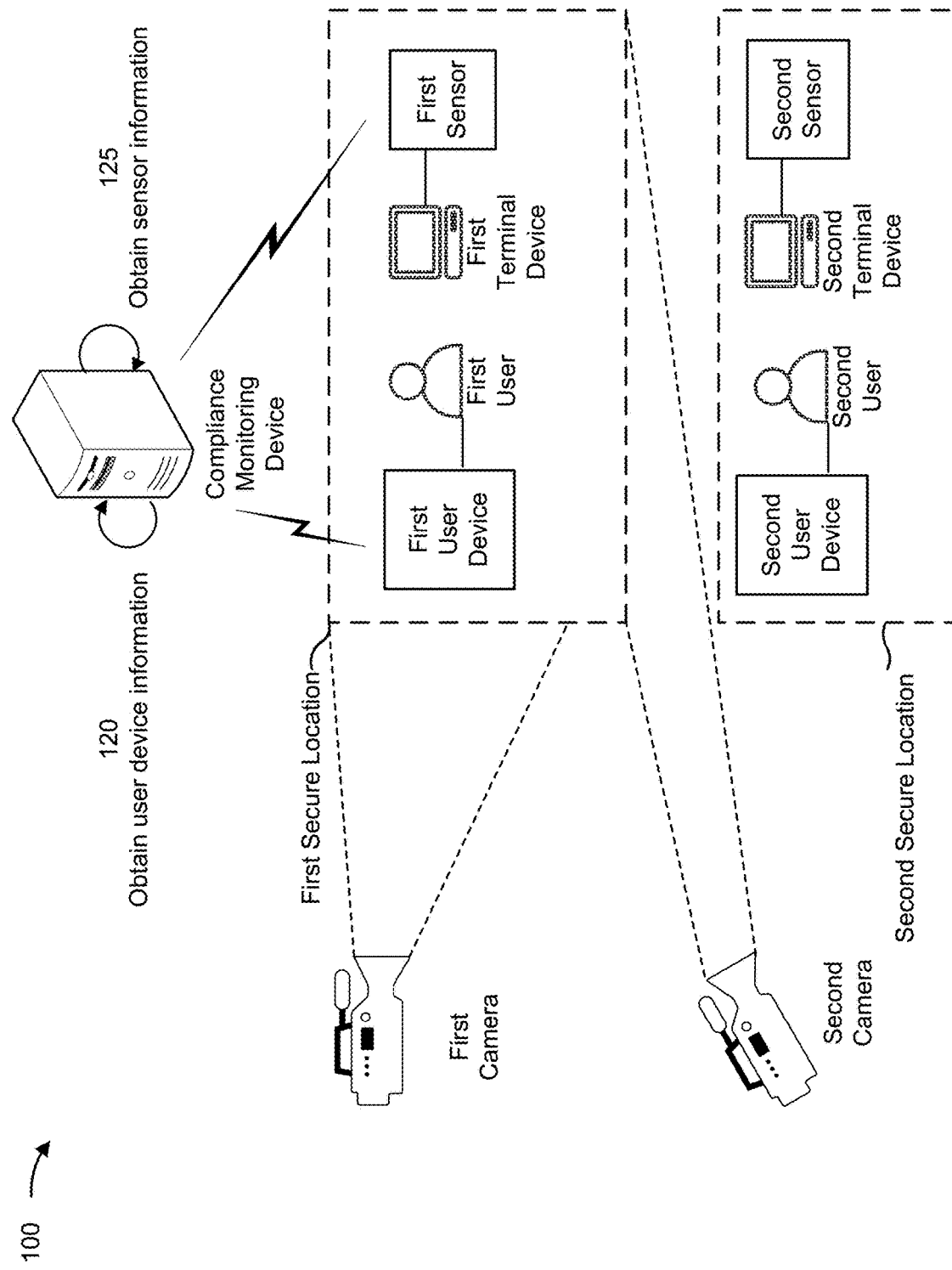

As shown in FIG. 1D, and by reference number 120, the compliance monitoring device may obtain user device information. For example, the compliance monitoring device may obtain, and the first user device may transmit, user device information associated with the first user device and/or the first user. In some implementations, the user device information may include authorization information and/or positioning information associated with the first user device and/or the first user. As an example, the authorization information may indicate an authorization status associated with the first user device and/or the first user (e.g., an indication that the first user device and/or the first user are authorized to participate in the compliance-based interaction or an indication that the first user device and/or the first user are not authorized to participate in the compliance-based interaction).

In some implementations, the compliance monitoring device may assign a first authorization level (e.g., a supervisor authorization level) or a second authorization level (e.g., an associate authorization level) to the first user device, the first user, and/or the compliance-based interaction. As an example, if the authorization levels (e.g., assigned by the compliance monitoring device) of the first user device and the first user meet an authorization criteria (e.g., assigned by the compliance monitoring device) of the compliance-based interaction, then the first user device and the first user are authorized to participate in the compliance-based interaction. As another example, if the authorization levels (e.g., assigned by the compliance monitoring device) of the first user device and the first user do not meet the authorization criteria (e.g., assigned by the compliance monitoring device) of the compliance-based interaction, then the first user device and the first user are not authorized to participate in the compliance-based interaction.

In some implementations, the compliance monitoring device may obtain, and the first user device may transmit, the user device information (e.g., including the authorization information and/or the positioning information indicated by the first user device). As an example, the positioning information associated with the first user device may include geographical data that indicates a location (e.g., latitude and longitude coordinates) of the first user device. For example, the first user device may transmit the user device information to the compliance monitoring device during a time period associated with the compliance-based interaction (e.g., a time period between the start of the compliance-based interaction and an end of the compliance-based interaction). An end of the compliance-based interaction may be based on detecting a last operation associated with the compliance-based interaction (e.g., as indicated by a corresponding compliance rule associated with the compliance-based interaction).

As an example, the first user device may periodically transmit the user device information to the compliance monitoring device. The compliance monitoring device may analyze (e.g., process) the authorization information to determine whether the first user device is authorized to participate in the compliance-based interaction and/or may analyze the positioning information to determine a user device location of the first user device and/or to track the user device location of the first user device (e.g., while the compliance-based interaction is ongoing). For example, the user device location of the first user device may indicate a location of the first user (e.g., with the assumption that the first user is carrying or is otherwise near the first user device).

As shown by reference number 125, the compliance monitoring device may obtain sensor information. For example, the compliance monitoring device may obtain, and the first sensor may transmit, the sensor information associated with the secure object. In some implementations, the sensor information may include status information associated with the secure object (e.g., associated with the first secure location). For example, the status information may indicate one or more states of the secure object (e.g., a closed state, an open state, a locked state, and/or an unlocked state).

In some implementations, the compliance monitoring device may obtain, and the first sensor may transmit, the sensor information. For example, the first sensor may transmit the sensor information to the compliance monitoring device during a time period associated with the compliance-based interaction (e.g., the time period between the start of the compliance-based interaction and an end of the compliance-based interaction. As an example, the first sensor may periodically transmit the sensor information (e.g., including the status information) to the compliance monitoring device. The compliance monitoring device may analyze (e.g., process) the sensor information to determine one or more states of the secure object (e.g., while the compliance-based interaction is ongoing).

Figure 1E:
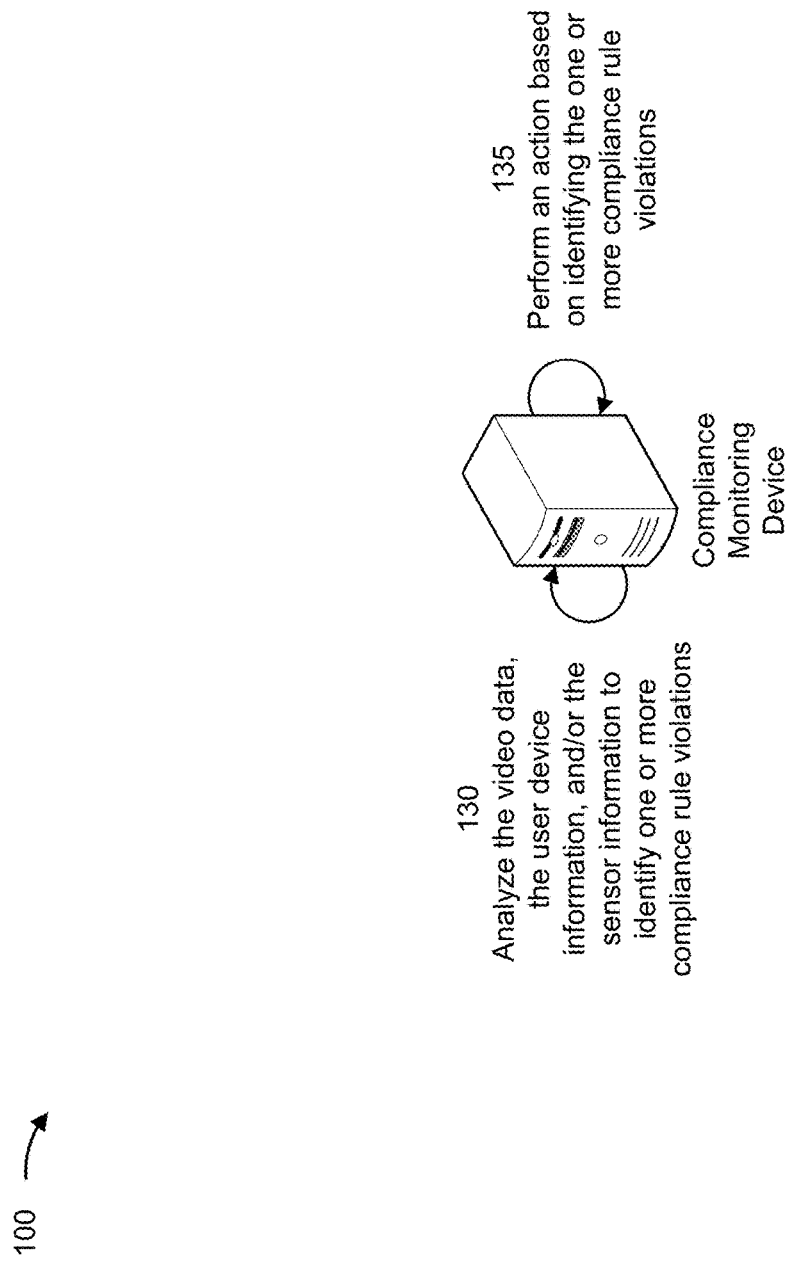

As shown in FIG. 1E, and by reference number 130, the compliance monitoring device may analyze the video data, the user device information, and/or the sensor information to identify one or more compliance rule violations. For example, the compliance monitoring device may simultaneously analyze at least two of the image information, the positioning information, or the status information (e.g., to determine whether a compliance rule is violated, as described in more detail elsewhere herein). In some implementations, the compliance-based interaction may be associated with one or more compliance rules. As an example, analyzing the video data, the user device information, and/or the sensor information may include applying the one or more compliance rules to the video data, the user device information, and/or the sensor information to determine whether the one or more compliance rules are violated, as described in more detail elsewhere herein.

In some implementations, a compliance rule associated with the compliance-based interaction may indicate that a distance between the user device location of the first user device (e.g., an employee) and a location of the secure object (e.g., that is associated with a workstation of the employee) must not satisfy a first distance threshold. As an example, the compliance monitoring device may compare the user device location of the first user device to the location of the secure object to determine whether the distance between the user device location and the location of the secure object satisfies the first distance threshold. For example, the compliance monitoring device may identify a compliance rule violation based on determining that the distance between the user device location of the first user device and the location of the secure object satisfies the first distance threshold (e.g., during the compliance-based interaction).

In some implementations, a compliance rule associated with the compliance-based interaction may indicate that a distance between the user device location of the first user device and the location of the secure object must not satisfy a second distance threshold when the secure object is in a given state (e.g., an unlocked state or an open state). As an example, the compliance monitoring device may compare the user device location to the location of the secure object to determine whether the distance between the user device location and the location of the secure object satisfies the second distance threshold and may determine whether the secure object is in the given state. For example, the compliance monitoring device may identify a compliance rule violation based on determining that the distance between the user device location and the location of the secure object satisfies the second distance threshold while the secure object is in an unlocked state or open state (e.g., based on determining that the secure object is in the unlocked state).

In some implementations, a compliance rule associated with the compliance-based interaction may indicate that a gaze associated with the first user must remain associated with a direction toward the first secure location during the compliance-based interaction. As an example, the compliance monitoring device may track, as described in more detail elsewhere herein, the gaze associated with the first user to determine whether the gaze associated with the first user is associated with the direction toward the first secure location during the compliance-based interaction. For example, the compliance monitoring device may identify a compliance rule violation based on determining that the gaze is not associated with the direction toward the first secure location during the compliance-based interaction (e.g., the gaze is associated with a direction that is not toward the first secure location). In some implementations, the compliance monitoring device may identify a compliance rule violation based on determining that the gaze of the first user is not associated with the direction toward the first secure location, during the compliance-based interaction, for an amount of time that satisfies a gaze threshold.

For example, the compliance monitoring device may determine, based on determining that the gaze is not associated with the direction toward the secure location during the compliance-based interaction, an elapsed gaze time that the gaze is not associated with the direction toward the secure location during the compliance-based interaction. The compliance monitoring device may compare the elapsed gaze time to a gaze threshold during the compliance-based interaction. The compliance monitoring device may identify the compliance rule violation based on determining that the gaze satisfies the gaze threshold during the compliance-based interaction.

In some implementations, a compliance rule may indicate that objects that are not associated with the compliance-based interaction must not be near the first secure location (e.g., at a location that enables the objects to be captured within the field of view of the first camera and/or within the field of view of the second camera). As an example, if the compliance-based interaction is associated with only the first user device (e.g., a wearable communication device), the first user (e.g., an employee that wears the wearable communication device), the first terminal device (e.g., a workstation), and/or the secure object (e.g., a cash drawer), and if the first camera, the second camera, and/or the compliance monitoring device identifies an additional object (e.g., a document that is dropped by the first user), as a foreign object (e.g., the document is not associated with the compliance-based interaction), then the compliance monitoring device may identify a compliance rule violation based on identifying the additional object as the foreign object (e.g., because the document is not associated with the compliance-based interaction).

In some implementations, a compliance rule associated with a compliance based interaction (e.g., an opening and/or a closing procedure) may indicate that objects that are located near the first secure location are foreign objects. As an example, the compliance rule may indicate that documents that are located near the first secure location are foreign objects. For example, if a document is left at the first secure location (e.g., by an employee after performing the opening and/or the closing procedure), then the compliance monitoring device may identify a compliance rule violation based on identifying the document as a foreign object.

In some implementations, a compliance rule associated with the compliance-based interaction may indicate that a distance between the user device location of the first user device and the secure object must not satisfy a third distance threshold when the secure object transitions from a first state to a second state (e.g., from the closed state to the open state). As an example, the compliance monitoring device may compare the user device location of the first user device to the secure object to determine whether the distance between the user device location of the first user device and the secure object satisfies the third distance threshold. Additionally, the compliance monitoring device may determine whether the secure object transitions from the closed state to the open state. For example, the compliance monitoring device may identify a compliance rule violation based on determining that the distance between the user device location of the first user device and the secure object satisfies the third distance threshold while the secure object transitions from the closed state to the open state (e.g., based on determining that the secure object transitions from the closed state to the open state).

In some implementations, a compliance rule associated with the compliance-based interaction may indicate that a duration time associated with the compliance-based interaction (e.g., a time difference between a time associated with the start and a time associated with the end of the compliance-based interaction) must not satisfy a time threshold. As an example, the compliance monitoring device may identify, using one or more computer vision techniques, a first image, of the set of images, associated with the start of the compliance-based interaction and a second image, of the set of images, associated with the end of the compliance-based interaction. The compliance monitoring device may determine, based on timestamp information (e.g., recorded by the first camera and/or the second camera and transmitted to the compliance monitoring device) associated with the first image and the second image, a duration time associated with the compliance-based interaction. The compliance monitoring device may compare the duration time to a time threshold to determine whether the duration time satisfies the time threshold. The compliance monitoring device may identify a compliance rule violation based on determining that the duration time satisfies the time threshold.

In some implementations, a compliance rule may indicate that the first user device and/or the first user must be authorized to participate in the compliance-based interaction. As an example, the compliance monitoring device may determine, based on the authorization information, whether the first user device and/or the first user are authorized to participate in the compliance-based interaction. As an example, the compliance monitoring device may determine that the first user and/or the first user device are not authorized to participate in the compliance-based interaction based on determining that authorization levels do not meet the authorization criteria of the compliance-based interaction. For example, the compliance monitoring device may identify a compliance rule violation based on determining that the first user device and/or the first user are not authorized to participate in the compliance-based interaction.

In some implementations, the compliance-based interaction may be associated with the first user device, the first user, and an additional user device of an additional user. As an example, the compliance monitoring device may determine a first user device location of the first user device and an additional user device location of the additional user device. For example, the compliance monitoring device may compare the first user device location and the additional user device location to a location of the secure object to determine whether at least one of a distance between the first user device location and the secure object and/or a distance between the second user device location and the secure object satisfies a fourth distance threshold during the compliance-based interaction. The compliance monitoring device may identify a compliance rule violation based on determining that at least one of the distance between the first user device location and the secure object or the distance between the second user device location and the secure object satisfies the fourth distance threshold.

In some implementations, a compliance rule associated with the compliance-based interaction may indicate that an object (e.g., an intruder) must not be detected during a restricted time period, such as an off-hour time period. As an example, the first camera and/or the second camera may capture, based on detecting a movement of an object (e.g., a movement of the intruder detected at the first secure location during the off-hour time period), an image associated with the object. The first camera and/or the second camera may transmit an indication of the image associated with the object (e.g., including timestamp information that indicates a date and time at which the image of the intruder is captured) to the compliance monitoring device.

For example, the compliance monitoring device may determine, based on the timestamp information, a capture time associated with the image of the object (e.g., the date and time at which the image of the intruder is captured). The compliance monitoring device may compare the capture time to the restricted time period to determine whether the image is captured at a time that is within the restricted time period (e.g., the date and time at which the image of the intruder is captured is within a first date and time indicated by the restricted time period and a second date and time indicated by the restricted time period). As an example, the compliance monitoring device may identify a compliance rule violation based on determining that the image is captured within the restricted time period.

As shown by reference number 135, the compliance monitoring device may provide, to the user device, an alert indication based on identifying the compliance rule violation. In some implementations, the compliance monitoring device may provide an audible indication, a text indication, or a haptic indication, among other examples. As an example, the compliance monitoring device may provide an audible indication for output via a speaker component of the first user device and/or the first terminal device. In some implementations, the compliance monitoring device may determine, based on the compliance rule violation, a remedy for the compliance rule violation. The compliance monitoring device may automatically provide an indication of the remedy for display via a user interface of the user device.

In some implementations, the compliance monitoring device may receive, from the first user device, a user input provided via an input option (e.g., provided for display on a user interface of the first user device). The user input may indicate that the compliance rule violation is remedied. In some implementations, the compliance monitoring device may generate, based on receiving the user input, a remedy indication that confirms that the compliance rule violation is remedied. The compliance monitoring device may automatically provide the remedy indication to another device (e.g., a device of a supervisor of an employee and/or a third party).

In some implementations, the compliance monitoring device may provide, to the first user device, a text indication (e.g., that indicates information associated with the one or more compliance rule violations and/or remedies associated with the one or more compliance rule violations). As another example, the compliance monitoring device may transmit the text indication (e.g., via an email) to another individual and/or another party. For example, the compliance monitoring device may transmit the text indication to a supervisor associated with the first user. As another example, the compliance monitoring may provide the haptic indication for output via a haptic feedback component of the first user device and/or the first terminal device.

In some implementations, the compliance monitoring device may provide the alert indication (e.g., a visual indication) via an alert component (e.g., a light component) of the first user device and/or the first terminal device. For example, the compliance monitoring device may activate the alert indication in response to identifying the one or more compliance rule violations and/or may deactivate the alert indication based on receiving feedback (e.g., a user input) that indicates that the one or more compliance rules violations are resolved.

In some implementations, the compliance monitoring device may transmit the alert indication to a third party (e.g., the police). For example, if the compliance monitoring device identifies a compliance rule violation based on determining that the first user device and/or the first user are not authorized to participate in the compliance-based interaction (e.g., if the first user device and/or the first user are participating in an interaction associated with entering a vault of bank in an unauthorized manner), then the compliance monitoring device may automatically transmit the alert notification to the third party (e.g., may automatically call the police to notify the police of the unauthorized participation of the first user device and/or the first user).

In some implementations, the compliance monitoring device may generate, based on identifying the compliance rule violation, compliance rule violation information. As an example, the compliance rule violation information may include an indication of a date and a time associated with the compliance rule violation, an indication of a compliance rule violation type, an indication of an identifier of the first user associated with the compliance rule violation, and/or a number of historical compliance rule violations committed by the first user. The compliance monitoring device may automatically provide, to a different device and based on generating the compliance rule violation information, the compliance rule violation information In some implementations, the compliance monitoring device may store information associated with the one or more compliance rule violations. For example, the compliance monitoring device may store (e.g., in a database) video data, user device information, and/or sensor information associated with the one or more compliance rule violations (e.g., information associated with timestamp(s), user(s) involved, and/or violation type(s), among other examples).

In this way, the compliance monitoring device may coordinate among multiple devices (e.g., one or more cameras, one or more user devices (e.g., of users), and/or one or more sensors associated with one or more secure objects, in real time, to automatically identify and/or report compliance rule violations (e.g., to an employee, a supervisor of the employee, and/or a third party, among other examples). By coordinating among multiple devices to automatically identify and/or report compliance rule violations, the compliance monitoring device can obtain all data necessary to determine whether a compliance rule violation occurs. This conserves resources (e.g., processing resources, memory resources, and/or network resources) that would have otherwise been used to analyze some data, but not enough data, to determine whether a compliance rule violation occurs.

Additionally, or alternatively, because the compliance rule violations are identified in real time, a need to store data and/or analyze data at a later date is mitigated, which conserves processing resources, memory resources, and/or network resources, among other examples. Furthermore, because the compliance monitoring device automatically identifies and/or reports compliance rule violations, resources (e.g., processing resources, memory resources, and/or network resources) are conserved that would have otherwise been used to manually review data associated with interactions that are not associated with a compliance rule violation.

In some implementations, the compliance monitoring device may use multiple cameras (e.g., in a synchronized manner) with an unobstructed field of view to effectively monitor a compliance-based interaction, which enables the compliance monitoring device to effectively identify compliance rule violations associated with the compliance-based interaction. Furthermore, the compliance monitoring device enables the one or more compliance rule violations to be quickly and/or effectively remedied (e.g., because the compliance monitoring device provides an indication of the one or more compliance rule violations shortly after identifying the one or more compliance rule violations).

As indicated above, FIGS. 1A-1E are provided as an example. Other examples may differ from what is described with regard to FIGS. 1A-1E.

Figure 2:
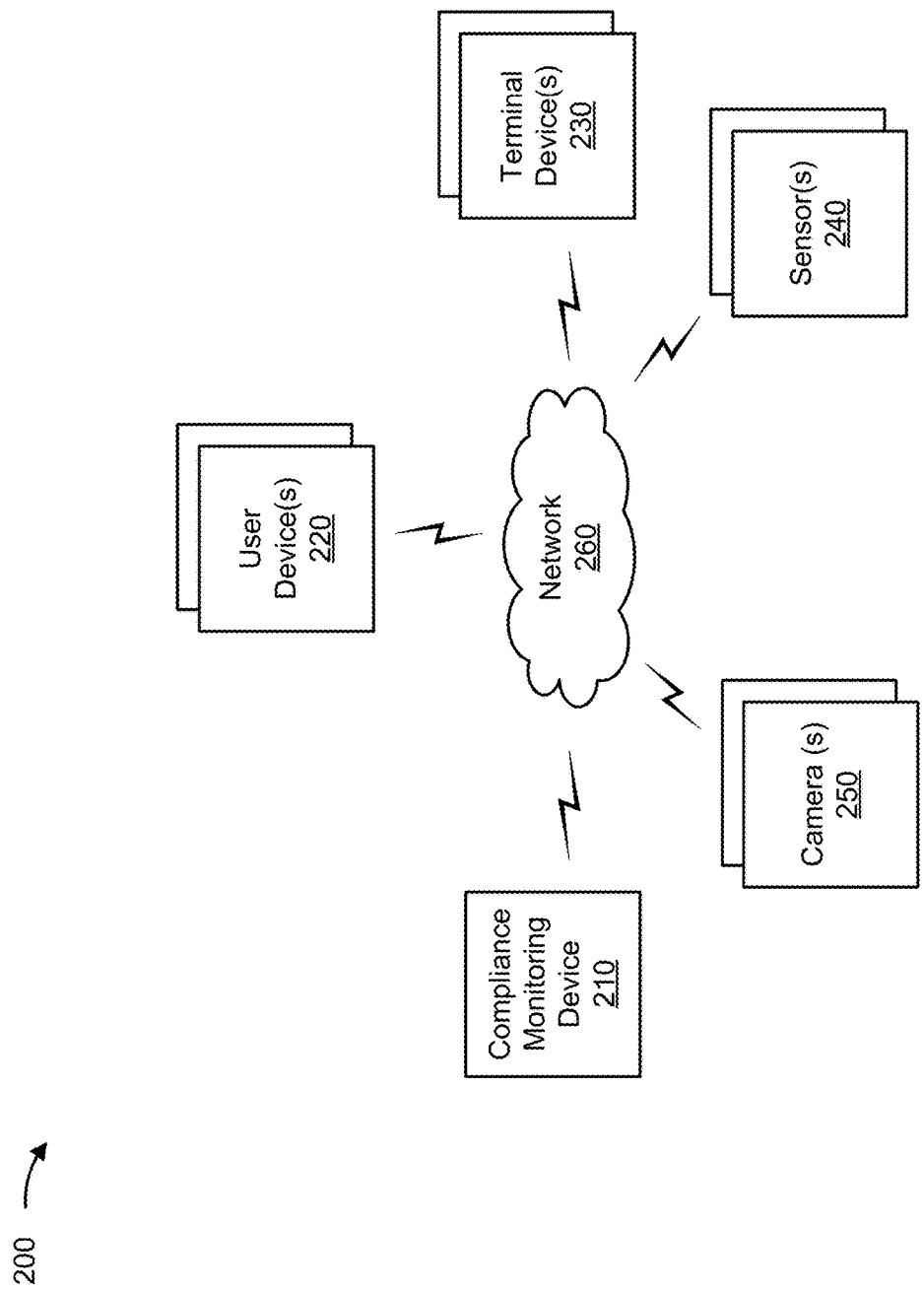
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a compliance monitoring device 210, one or more user devices 220 (e.g., the first user device and/or the second user device described above in connection with FIGS. 1A-1E), one or more terminal devices 230 (e.g., the first terminal device and/or the second terminal device described above in connection with FIGS. 1A-1E), one or more sensors 240 (e.g., the first sensor and/or the second sensor described above in connection with FIGS. 1A-1E), one or more cameras 250 (e.g., the first camera and/or the second camera described above in connection with FIGS. 1A-1E), and a network 260. Devices of environment 200 may interconnect via wired connections, wireless connections, or a combination of wired and wireless connections.

The compliance monitoring device 210 may include one or more devices capable of receiving, generating, storing, processing, providing, and/or routing information associated with computer vision-assisted compliance monitoring, as described elsewhere herein. The compliance monitoring device 210 may include a communication device and/or a computing device. For example, the compliance monitoring device 210 may include a server, such as an application server, a client server, a web server, a database server, a host server, a proxy server, a virtual server (e.g., executing on computing hardware), or a server in a cloud computing system. In some implementations, the compliance monitoring device 210 may include computing hardware used in a cloud computing environment.

A user device 220 may include one or more devices capable of receiving, generating, storing, processing, and/or providing information associated with computer vision-assisted compliance monitoring, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

A terminal device 230 may include one or more devices capable of receiving, generating, storing, processing, and/or providing information associated with computer vision-assisted compliance monitoring, as described elsewhere herein. The terminal device 230 may include a communication device and/or a computing device. For example, the terminal device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the terminal device 230 may include a point-of-sale (POS) terminal, a payment terminal (e.g., a credit card terminal, a contactless payment terminal, a mobile credit card reader, or a chip reader), a cash terminal, a bank teller system, a teller terminal, and/or an automated teller machine (ATM), among other examples.

A sensor 240 may include one or more wired or wireless devices capable of receiving, generating, storing, transmitting, processing, detecting, and/or providing information associated with computer vision-assisted compliance monitoring, as described elsewhere herein. For example, the sensor 240 may include, an accelerometer, a gyroscope, a proximity sensor, a light sensor, a noise sensor, a pressure sensor, an ultrasonic sensor, a positioning sensor, a capacitive sensor, a timing device, an infrared sensor, an active sensor (e.g., a sensor that requires an external power signal), a passive sensor (e.g., a sensor that does not require an external power signal), a biological sensor, a magnetic sensor, an electromagnetic sensor, an analog sensor, and/or a digital sensor, among other examples. The sensor 240 may sense or detect a condition or information and transmit, using a wired or wireless communication interface, an indication of the detected condition or information to other devices in the environment 200.

A camera 250 may include one or more wired or wireless devices capable of receiving, generating, storing, transmitting, processing, detecting, and/or providing information associated with computer vision-assisted compliance monitoring, as described elsewhere herein. For example, the camera 250 may include an image capturing device, a video capturing device, a security camera, an image sensor, a proximity sensor, a light sensor, a noise sensor, a positioning sensor, a capacitive sensor, a timing device, an infrared sensor, an active sensor (e.g., a sensor that requires an external power signal), a passive sensor (e.g., a sensor that does not require an external power signal), an electromagnetic sensor, an analog sensor, and/or a digital sensor, among other examples. The camera 250 may sense or detect a condition or information and transmit, using a wired or wireless communication interface, an indication of the detected condition or information to other devices in the environment 200.

The network 260 may include one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
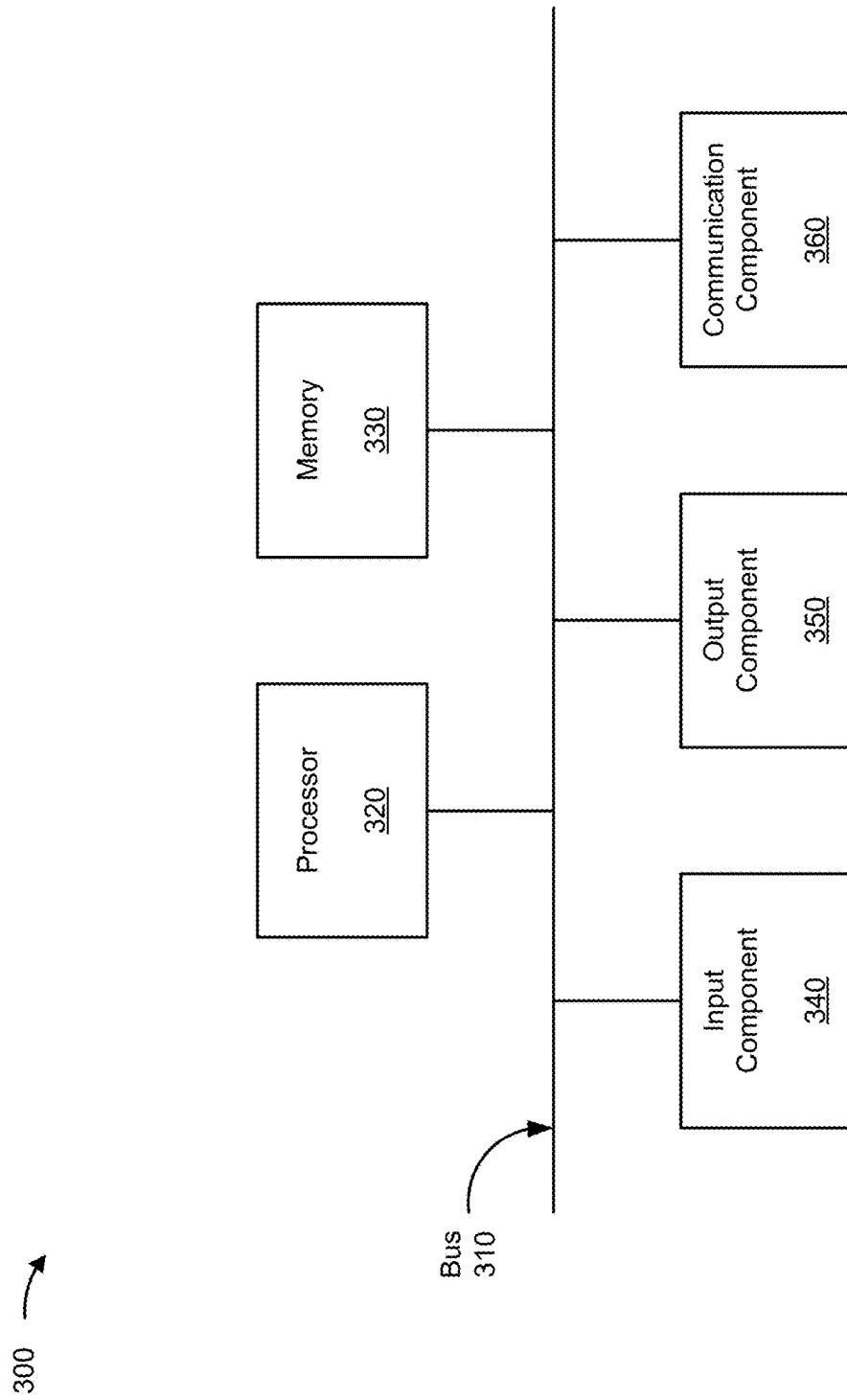
FIG. 3 is a diagram of example components of a device associated with computer vision-assisted compliance monitoring, in accordance with some embodiments of the present disclosure.

FIG. 3 is a diagram of example components of a device 300 associated with computer vision-assisted compliance monitoring. The device 300 may correspond to the compliance monitoring device 210, the user device 220, the terminal device 230, the sensor 240, and/or the camera 250. In some implementations, the compliance monitoring device 210, a user device 220, a terminal device 230, a sensor 240, and/or a camera 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
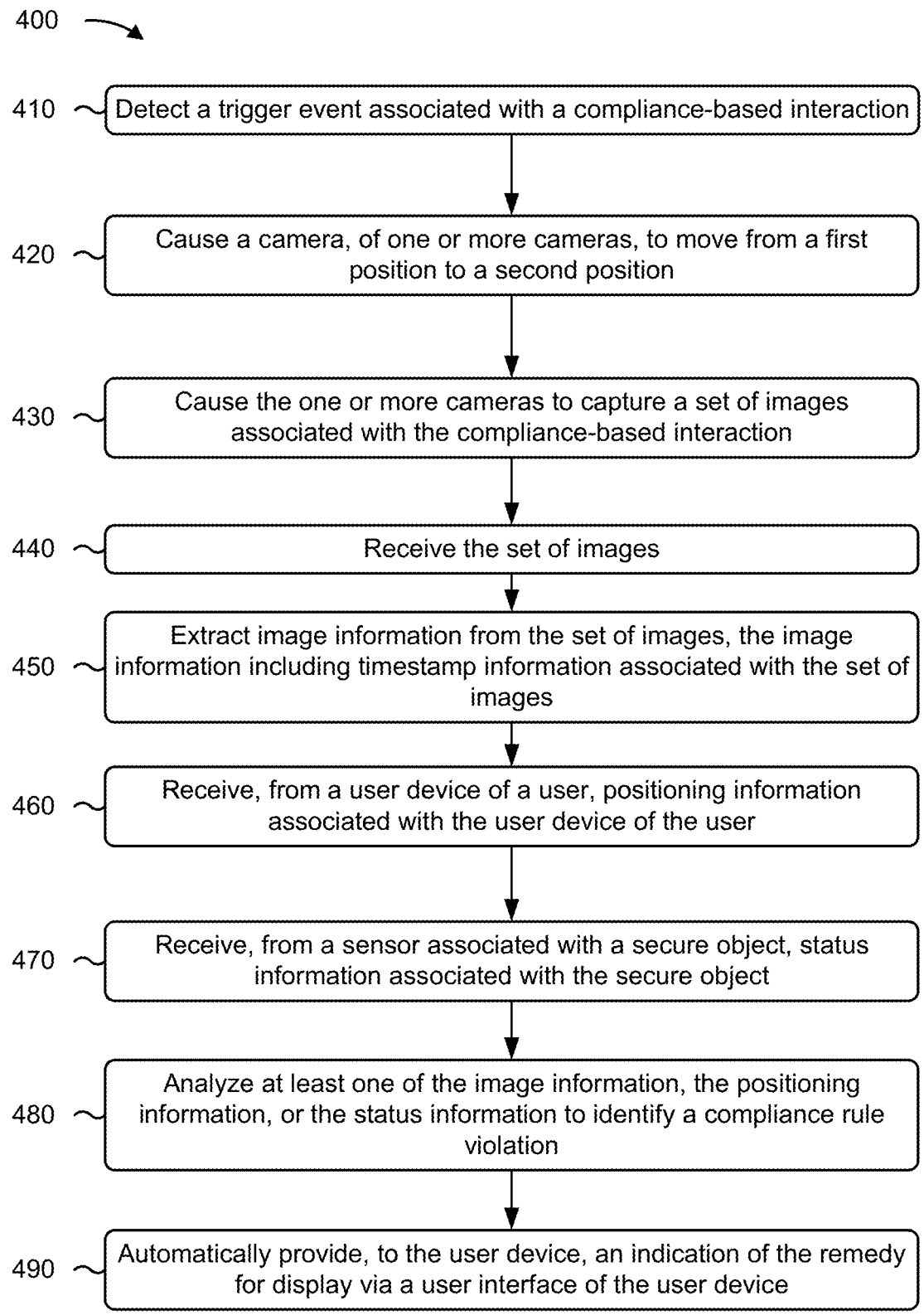
FIG. 4 is a flowchart of an example process associated with computer vision-assisted compliance monitoring, in accordance with some embodiments of the present disclosure.

FIG. 4 is a flowchart of an example process 400 associated with computer vision-assisted compliance monitoring. In some implementations, one or more process blocks of FIG. 4 may be performed by the compliance monitoring device 210. In some implementations, one or more process blocks of FIG. 4 may be performed by another device or a group of devices separate from or including the compliance monitoring device 210, such as a user device 220, a terminal device 230, and/or a camera 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include detecting a trigger event associated with a compliance-based interaction (block 410). For example, the compliance monitoring device 210 (e.g., using processor 320 and/or memory 330) may detect a trigger event associated with a compliance-based interaction, as described above in connection with reference number 105 of FIG. 1A. In some implementations, the compliance-based interaction is associated with at least one of a secure location, of the one or more secure locations, a user device, of the one or more user devices, or a user, of the one or more users, associated with the user device, as described above in connection with FIGS. 1A-1E. As an example, a first user device and/or a first terminal device may detect a user interaction (e.g., a press of a button), of the first user, via a user interface of the first user device and/or a user interface of the first terminal device. As an example, the first user device and/or the first terminal device may generate an indication of the trigger event associated with the compliance-based interaction. The compliance monitoring device may receive, and the first user device and/or the first terminal device may receive, the indication of the trigger event associated with the compliance-based event.

As further shown in FIG. 4, process 400 may include causing a camera to move from a first position to a second position (block 420). For example, the compliance monitoring device 210 (e.g., using processor 320 and/or memory 330) may cause, based on detecting the trigger event, a camera, of the one or more cameras, to move from a first position to a second position, wherein a field of view of the camera is pointed in a direction toward the secure location when the camera is in the second position, as described above in connection with reference number 110 of FIG. 1B. As an example, the compliance monitoring device 210 may align the field of view of the second camera in a direction toward the first secure location (e.g., in response to receiving the indication of the trigger event associated with the compliance-based interaction). In other words, the compliance monitoring device 210 may reposition the second camera (e.g., rotate along an axis) to move the field of view of the second camera from pointing in a direction toward the second secure location to pointing in the direction toward the first secure location.

As further shown in FIG. 4, process 400 may include causing the one or more cameras to capture a set of images associated with the compliance-based interaction (block 430). For example, the compliance monitoring device 210 (e.g., using processor 320 and/or memory 330) may cause the one or more cameras to capture a set of images associated with the compliance-based interaction, as described above in connection with reference number 115 of FIG. 1C. As an example, the compliance monitoring device 210 may cause the first camera and/or the second camera to capture the images (e.g., video data) in response to receiving the indication of the trigger event associated with the compliance-based interaction. In some implementations, the first camera and/or the second camera may capture real-time video data. As an example, the first camera and/or the second camera may transmit, and the compliance monitoring device may receive, the real-time video data via a live feed (e.g., a real-time video stream).

As further shown in FIG. 4, process 400 may include receiving the set of images (block 440). For example, the compliance monitoring device 210 (e.g., using processor 320, memory 330, input component 340, and/or communication component 360) may receive the set of images, as described above in connection with FIG. 1C. As an example, the first camera and/or the second camera may transmit, and the compliance monitoring device 210 may receive, the set of images.

As further shown in FIG. 4, process 400 may include extracting image information from the set of images, the image information including timestamp information associated with the set of images (block 450). For example, the compliance monitoring device 210 (e.g., using processor 320 and/or memory 330) may extract image information from the set of images, the image information including timestamp information associated with the set of images, as described above in connection with FIG. 1C. As an example, the compliance monitoring device 210 may extract, using one or more computer vision techniques, image information from the images, such as object detection data, object recognition data, object tracking data, and/or timestamp information, among other examples.

As further shown in FIG. 4, process 400 may include receiving, from a user device of a user, positioning information associated with the user device of the user (block 460). For example, the compliance monitoring device 210 (e.g., using processor 320, memory 330, input component 340, and/or communication component 360) may receive, from the user device of the user, positioning information associated with the user device of the user, as described above in connection with reference number 120 of FIG. 1D. As an example, the compliance monitoring device 210 may obtain, and the first user device may transmit, user device information associated with the first user device and/or the first user. In some implementations, the user device information may include authorization information and/or positioning information associated with the first user device and/or the first user.

As further shown in FIG. 4, process 400 may include receiving, from a sensor associated with a secure object, status information associated with the secure object (block 470). For example, the compliance monitoring device 210 (e.g., using processor 320, memory 330, input component 340, and/or communication component 360) may receive, from the sensor associated with the secure object, status information associated with the secure object, as described above in connection with reference number 125 of FIG. 1D. As an example, the compliance monitoring device 210 may obtain, and the first sensor may transmit, the sensor information associated with the secure object. In some implementations, the sensor information may include status information associated with the secure object (e.g., associated with the first secure location). For example, the status information may indicate one or more states of the secure object (e.g., a closed state, an open state, a locked state, and/or an unlocked state).

As further shown in FIG. 4, process 400 may include analyzing at least one of the image information, the positioning information, or the status information to identify a compliance rule violation (block 480). For example, the compliance monitoring device 210 (e.g., using processor 320 and/or memory 330) may analyze at least one of the image information, the positioning information, or the status information to identify a compliance rule violation, as described above in connection with reference number 130 of FIG. 1E. As an example, analyzing the image information, the user device information, and/or the status information may include applying the one or more compliance rules to the video data, the user device information, and/or the status to determine whether the one or more compliance rules are violated, as described in more detail elsewhere herein.

As further shown in FIG. 4, process 400 may include automatically providing, to the user device, an alert indication (block 490). For example, the compliance monitoring device 210 (e.g., using processor 320 and/or memory 330) may automatically provide, to the user device, an indication of the remedy for display via a user interface of the user device, as described above in connection with reference number 135 of FIG. 1E. As an example, the compliance monitoring device 210 may provide, to the user device, an alert indication based on identifying the compliance rule violation. In some implementations, the compliance monitoring device 210 may provide an audible indication, a text indication, or a haptic indication, among other examples. In some implementations, the compliance monitoring device 210 may determine, based on the compliance rule violation, a remedy for the compliance rule violation. The compliance monitoring device 210 may automatically provide an indication of the remedy for display via a user interface of the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for computer vision-assisted compliance monitoring, the system comprising:
   one or more sensors associated with one or more secure objects;
   one or more user devices associated with one or more users;
   one or more cameras;
   one or more memories; and
   one or more processors, communicatively coupled to the one or more memories, configured to:
      detect, using one or more computer vision techniques, a trigger event associated with a compliance-based interaction that occurs at a secure location,
         wherein the compliance-based interaction is associated with at least one of a secure object, of the one or more secure objects, or a user device, of the one or more user devices, or a user, of the one or more users, that is associated with the user device;
      adjust, based on detecting the trigger event, at least one camera, of the one or more cameras, to align a field of view of the at least one camera with the secure location;
      cause the one or more cameras to capture video data associated with at least one of the secure object, the user device, or the user,
      obtain, from the one or more cameras, the video data;
      obtain, from the user device, user device information, including:
         positioning information associated with the user device, and
         authorization information indicating whether the user device is authorized to participate in the compliance-based interaction or whether the user is authorized to participate in the compliance-based interaction;
      obtain, from the one or more sensors, sensor information, including:
         information that indicates a motion or a movement associated with the secure object, and
         status information that indicates a state of the secure object, wherein the state includes a closed state, an open state, a locked state or an unlocked state;
      analyze, simultaneously and in real time, the video data, the user device information, and the sensor information to identify a compliance rule violation, wherein the identification of the compliance rule violation is based on applying a compliance rule to the video data, the user device information, and the sensor information; and provide, to the user device, an alert indication based on identifying the compliance rule violation.

2. The system of claim 1, wherein the one or more processors, to analyze the video data, the user device information, and the sensor information to identify the compliance rule violation, are configured to:

determine, based on the positioning information, a user device location of the user device;

compare the user device location to a location of the secure object to determine whether a distance between the user device location and the location of the secure object satisfies a distance threshold during the compliance-based interaction; and identify the compliance rule violation based on the distance satisfying the distance threshold during the compliance-based interaction.

3. The system of claim 1, wherein the user device is a first user device, of the one or more user devices, wherein the user is a first user, of the one or more users, associated with the first user device, wherein the compliance-based interaction is associated with a second user device, of the one or more user devices, associated with a second user, of the one or more users, and wherein the one or more processors, to analyze the video data, the user device information, and the sensor information to identify the compliance rule violation, are configured to:

determine, based on the positioning information, a first user device location of the first user device and a second user device location of the second user device;

compare the first user device location and the second user device location to a location of the secure object to determine whether at least one of a first distance between the first user device location and the location of the secure object or a second distance between the second user device location and the location of the secure object satisfies a distance threshold during the compliance-based interaction; and identify the compliance rule violation based on determining that at least one of the first distance between the first user device location and the location of the secure object or the second distance between the second user device location and the location of the secure object satisfies the distance threshold during the compliance-based interaction.

4. The system of claim 1, wherein the one or more processors, to analyze the video data, the user device information, and the status-sensor information to identify the compliance rule violation, are configured to:

determine, based on the status information, that the secure object has transitioned to the unlocked state during the compliance-based interaction;

determine, based on the positioning information, a user device location of the user device;

compare the user device location to a location of the secure object to determine whether a distance between the user device location and the location of the secure object satisfies a distance threshold when the secure object is in the unlocked state; and identify the compliance rule violation based on determining that the distance satisfies the distance threshold.

5. The system of claim 1, wherein the one or more processors, to analyze the video data, the user device information, and the sensor information to identify the compliance rule violation, are configured to:

identify, by using the one or more computer vision techniques and based on the video data, iris features associated with the user, track, by using the one or more computer vision techniques and based on identifying the iris features, a gaze associated with the user, determine, based on tracking the gaze, whether the gaze is associated with a direction toward the secure location during the compliance-based interaction;

determine, based on determining that the gaze is not associated with the direction toward the secure location during the compliance-based interaction, an elapsed gaze time that the gaze is not associated with the direction toward the secure location during the compliance-based interaction;

compare the elapsed gaze time to a gaze threshold during the compliance-based interaction; and identify the compliance rule violation based on determining that the gaze satisfies the gaze threshold during the compliance-based interaction.

6. The system of claim 1, wherein the one or more processors, to analyze the video data, the user device information, and the sensor information to identify the compliance rule violation, are configured to:

identify, by using the one or more computer vision techniques and based on the video data, an object that is in the secure location;

determine, based on identifying the object, that the object is a foreign object; and identify the compliance rule violation based on determining that the object is the foreign object.

7. The system of claim 1, wherein the one or more processors, to provide, to the user device, the alert indication, are configured to:

provide, to the user device, a at least one of:
 an audible indication,
 a text indication, or
 a haptic indication.

8. The system of claim 1, wherein the field of view is an unobstructed field of view of the compliance-based interaction.

9. A method of computer vision-assisted compliance monitoring, comprising:

detecting, by a device, a trigger event associated with a compliance-based interaction, wherein the compliance-based interaction is associated with a secure location, a user device of a user, a sensor associated with a secure object, and one or more cameras;

causing, by the device and based on detecting the trigger event, a camera, of the one or more cameras, to move from a first position to a second position, wherein a field of view of the camera is pointed in a direction toward the secure location when the camera is in the second position;

causing, by the device, the one or more cameras to capture a set of images associated with the compliance-based interaction;

receiving, by the device, the set of images;

extracting, by the device, image information from the set of images, the image information including timestamp information associated with the set of images;

receiving, by the device and from the user device of the user, user device information, including:
positioning information associated with the user device, and
authorization information indicating whether the user device is authorized to participate in the compliance-based interaction or whether the user is authorized to participate in the compliance-based interaction;

receiving, by the device and from the sensor associated with the secure object, status sensor information, including:
information that indicates a motion or a movement associated with the secure object, and
status information that indicates a state of the secure object, wherein the state includes a closed state, an open state, a locked state or an unlocked state;

analyzing, by the device simultaneously and in real time, the image information, the user device information, and the sensor information to identify a compliance rule violation,
wherein the identification of the compliance rule violation is based on applying a compliance rule to the image information, the user device information, and the sensor information;

determining, by the device and based on the compliance rule violation, a remedy for the compliance rule violation; and automatically providing, by the device and to the user device, an indication of the remedy for display via a user interface of the user device.

10. The method of claim 9, wherein detecting the trigger event associated with the compliance-based interaction comprises:
detecting motion, in a direction toward the secure location, of at least one secure object, the user device, or the user.

11. The method of claim 9, further comprising:
generating, by the device and based on identifying the compliance rule violation, compliance rule violation information, the compliance rule violation information including:
an indication of a date and a time associated with the compliance rule violation,
an indication of a compliance rule violation type, and
an indication of an identifier of the user associated with the compliance rule violation; and
automatically providing, to a different device and based on generating the compliance rule violation information, the compliance rule violation information.

12. The method of claim 11, wherein the compliance rule violation information further includes a number of historical compliance rule violations committed by the user.

13. The method of claim 9, wherein analyzing the the image information, the user device information, and the sensor information to identify the compliance rule violation comprises:
determining, based on the status information, that the secure object has transitioned from the closed state to the open state during the compliance-based interaction; and
identifying the compliance rule violation based on determining that the secure object has transitioned from the closed state to the open state during the compliance-based interaction.

14. The method of claim 9, wherein analyzing the the image information, the user device information, and the sensor information to identify the compliance rule violation comprises:
identifying, using one or more computer vision techniques and based on the image information, a first image, of the set of images, associated with a start of the compliance-based interaction;
identifying, using the one or more computer vision techniques and based on the image information, a second image, of the set of images, associated with an end of the compliance-based interaction;
determining, based on timestamp information associated with the first image and the second image, a first time associated with the first image and a second time associated with the second image;
determining a duration time that is a difference between the first time and the second time;
comparing the duration time to a time threshold to determine whether the duration time satisfies the time threshold; and
identifying the compliance rule violation based on the duration time satisfying the time threshold.

15. A non-transitory computer-readable medium storing a set of instructions, the set of instructions comprising:
one or more instructions that, when executed by one or more processors of a device, cause the device to:
detect a trigger event associated with a compliance-based interaction at a secure location,
wherein the compliance-based interaction is associated with a user device of a user, a sensor associated with a secure object, and one or more cameras;
cause, based on detecting the trigger event, the one or more cameras to capture video data associated with the compliance-based interaction, the video data including timestamp information;
receive, from the one or more cameras, the video data;
receive, from the user device, user device information associated with the user device of the user,
wherein the user device information includes:
positioning information associated with the user device, and
authorization information indicating whether the user device is authorized to participate in the compliance-based interaction or whether the user is authorized to participate in the compliance-based interaction;
receive, from the sensor associated with the secure object, sensor information, including:
information that indicates a motion or a movement associated with the secure object, and
status information that indicates a state of the secure object, wherein the state includes a closed state, an open state, a locked state or an unlocked state;
analyze, simultaneously and in real time, the video data, the user device information, and the sensor information to identify a compliance rule violation,
wherein the identification of the compliance rule violation is based on applying a compliance rule to the video data, the user device information, and the sensor information; and
automatically transmit, an alert indication to the user device.

16. The non-transitory computer-readable medium of claim 15, wherein the alert indication includes an input option, and wherein the one or more instructions, when executed by the one or more processors, further cause the device to:

receive, from the user device, a user input provided via the input option,
wherein the user input indicates that the compliance rule violation is remedied.

17. The non-transitory computer-readable medium of claim 16, wherein the one or more instructions, when executed by the one or more processors, further cause the device to:

generate, based on receiving the user input, a remedy indication that confirms that the compliance rule violation is remedied; and automatically provide, and based on generating the remedy indication, the remedy indication to another device.

18. The non-transitory computer-readable medium of claim 15, wherein the one or more instructions, that cause the device to analyze the video data, the user device information, and the sensor information to identify the compliance rule violation, cause the device to:

determine, based on the authorization information, whether the user device is authorized to participate in the compliance-based interaction; and identify the compliance rule violation based on determining that the user device is not authorized to participate in the compliance-based interaction.

19. The non-transitory computer-readable medium of claim 15, wherein, the one or more instructions, that cause the device to receive, from the one or more cameras, the video data, cause the device to:

receive the video data via a real-time video stream.

* * * * *